United States Patent [19]

Pearson, Sr.

[11] 4,171,145

[45] Oct. 16, 1979

[54] RETRACTABLE SEAT COVER APPARATUS FOR MOTORCYCLES

[76] Inventor: Roger W. Pearson, Sr., Phoenix, Ariz.

[21] Appl. No.: 910,443

[22] Filed: May 30, 1978

[51] Int. Cl.² ............................................. B60J 7/20
[52] U.S. Cl. ................................ 296/78.1; 150/52 K; 296/136; 280/289 R
[58] Field of Search ............................ 296/136, 78.1; 280/289 R; 160/23 R; 297/184; 150/52 K

[56] References Cited

U.S. PATENT DOCUMENTS

| | | | |
|---|---|---|---|
| 1,853,742 | 4/1932 | Owen et al. | 150/52 K |
| 3,537,746 | 11/1970 | Peters | 296/78.1 |
| 3,659,872 | 5/1972 | Warner | 296/78.1 |
| 3,884,523 | 5/1975 | Allen | 296/136 |

Primary Examiner—Robert R. Song
Attorney, Agent, or Firm—Cahill, Sutton & Thomas

[57] ABSTRACT

A retractable protective covering which may be unrolled from a spring loaded spool mounted in a housing attached to a motorcycle behind the motorcycle seat to cover the seat and the tank of the motorcycle. The protective covering includes a long, substantially rectangular top panel formed of heavy waterproof material and two long, narrow upper side panels and two long, narrow lower side panels. Each side panel includes an upper panel and a lower panel hinged to the upper panel by means of a strip of flexible fabric. A pair of V-shaped members fastened to opposite sides of the housing serve as guides to guide the unfolding of the upper and lower panels as the protective cover is extended.

10 Claims, 7 Drawing Figures

RETRACTABLE SEAT COVER APPARATUS FOR MOTORCYCLES

BACKGROUND OF THE INVENTION

1. Field of the Invention

The invention relates to protective covers, and more particularly to retractable covers for covering seats and fuel tanks of motorcycles.

2. Description of the Prior Art

The modern motorcycle rider typically utilizes his motorcycle for a wide variety of purposes, including pleasure trips, running errands, and riding to and from work. It is therefore desirable that the seat and fuel tank be kept free of dust, dirt, and moisture which may accumulate when the motorcycle is parked, so that the rider's clothing will remain presentable and will not be soiled or moistened. In hot climates, the black vinyl material of which motorcycle seats are typically composed may become very hot, causing considerable discomfort to the rider when he first mounts the motorcycle. Such heat further seriously degrades the vinyl material. The typical modern motorcycle rider takes considerable pride in the overall appearance of his motorcycle, especially in the cleanliness and shininess of the fuel tank. The intense sunlight and high temperatures characteristic of the southwestern United States, where motorcycle riding is especially popular, rapidly oxidizes the paint or lacquer finish of motorcycle fuel tanks. There is a presently unmet need for a convenient, retractable protective cover apparatus which can be conveniently deployed by a motorcycle rider to protect motorcycle seats and fuel tanks from the weather.

Although a number of retractable protective cover devices are known for various vehicles, including motorcycles, none are well suited to the needs of modern motorcycle riders who use motorcycles for the above variety of purposes. What is needed is a cover which may be hurriedly extended, fastened in the extended mode, and hurriedly retracted in as little time as possible and with as few motions as possible. The state of the art for retractable protective covers for motorcycles is generally shown in U.S. Pat. Nos. 1,853,742; 3,537,746; and 3,884,523. The state of the art for other types of retractable vehicle covers is generally shown in U.S. Pat. Nos. 3,146,824; 3,563,594; 3,021,894; 3,806,185; 1,770,503; and 1,327,558. The retractable protective covers known in the prior art are not satisfactory for modern motorcyclists because such retractable protective covers are time consuming and inconvenient to use because too many unfolding and/or attaching operations are required.

SUMMARY OF THE INVENTION

Accordingly, it is an object of the invention to provide a retractable protective motorcycle seat cover which is conveniently extended and retracted by the rider.

It is another object of the invention to provide a retractable motorcycle seat cover which automatically folds as it is retracted.

It is another object of the invention to provide a retractable motorcycle cover which automatically folds smoothly as it is retracted.

Briefly described, and in accordance with one embodiment thereof, the invention provides a retractable protective covering apparatus for attachment to a motorcycle for covering the seat and fuel tank of the motorcycle. The covering apparatus is enclosed in a housing having a spring-loaded spool mounted therein. A protective cover is wound around the spring loaded spool, and can be withdrawn from the housing and extended over the seat and fuel tank of the motorcycle and attached to the motorcycle to maintain the protective cover in the extended configuration. The protective cover includes a top panel having a width approximately equal to the length of the spring loaded spool and first and second upper side panels each having an inside edge attached to a respective inside edge of the top panel and each hingably connected by means of flexible hinge strips to first and second lower side panels, respectively. In one embodiment of the invention, the forward edges of the top panel and side panels are attached, respectively, to a plurality of slotted bars by means of slots therein. Slotted receiving tubes are attached to either of the front side portions of the fuel tank for receiving the slotted bars attached to the upper and lower side panels, thereby maintaining the protective cover in an extended configuration over the seat and fuel tank.

DESCRIPTION OF THE INVENTION

Figure 1:
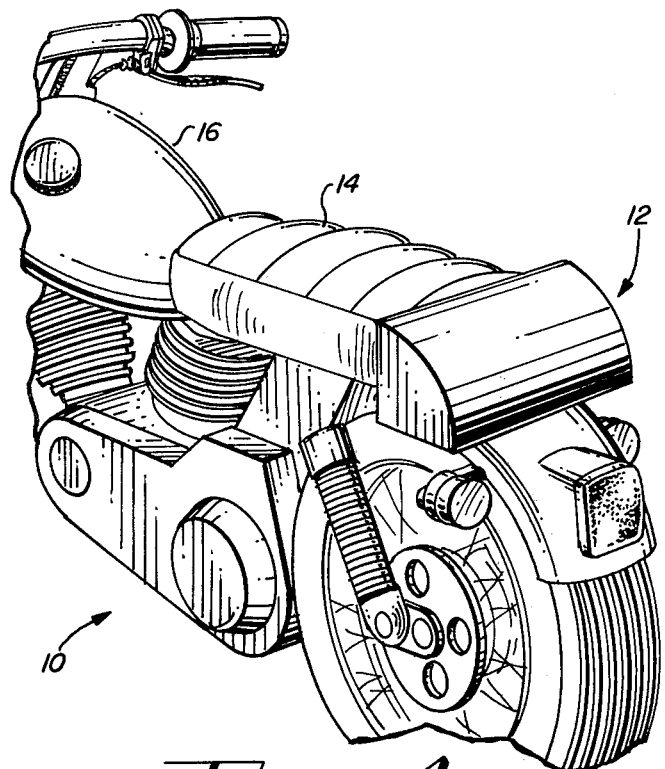
FIG. 1 is a perspective view of a housing of a retractable protective cover installed on a motorcycle.

Referring now to the drawings, the present invention includes a housing 12 mounted behind the seat 14 of a motorcycle 10. Housing 12 is affixed to a luggage rack or the like by means of a mounting bracket 37.

Figure 3:
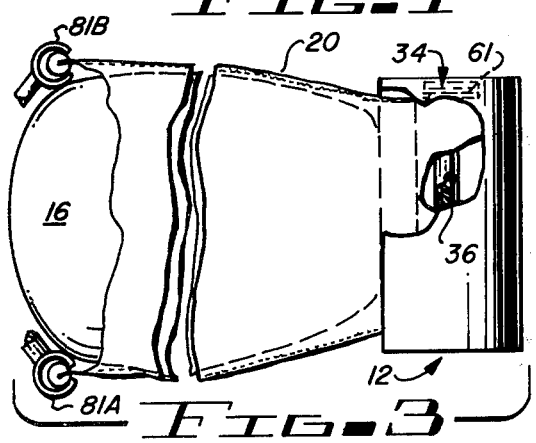
FIG. 3 is a top view indicating how the retractable protective cover extends to cover a motorcycle seat and engage connectors which hold the cover in the extended position.
Figure 4:
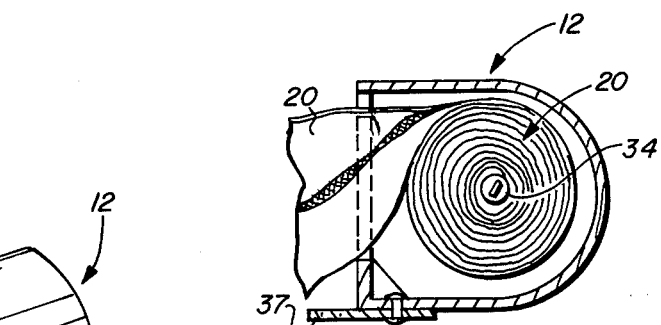
FIG. 4 is a section view illustrating how the protective cover is folded and wound on a spring loaded spool.

A retractable protective cover 20 is initially folded and tightly wound up on a spring loaded spool assembly 34, as shown in the partial sectional diagram of FIG. 3. Spool assembly 34 includes an interior spring 36, which is attached at one end to the spool and at the other end to a bracket 61 (FIG. 3). As protective covering 20 is withdrawn (as shown in FIGS. 2 and 3) it is unwound from spool assembly 34, increasing the tension on spring 36.

If protective covering 20 is released, the tension on spring 36 draws protective covering 20 back into housing 12.

Figure 2:
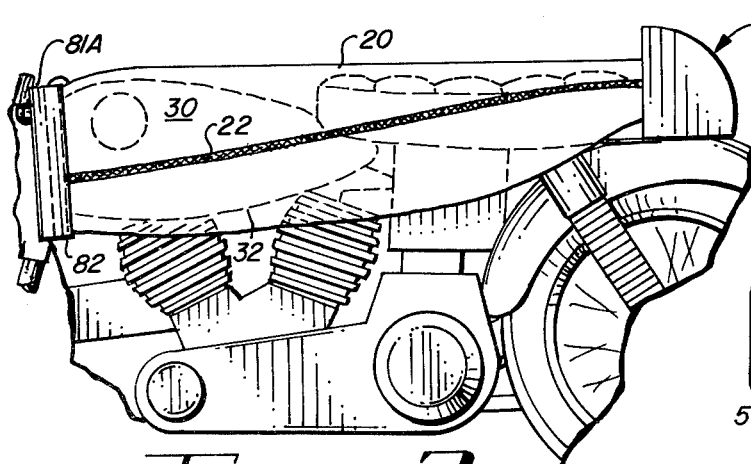
FIG. 2 is a side view showing the protective cover extended to cover the seat and fuel tank of a motorcycle.

As shown in FIG. 2, protective covering 20 extends from housing 12 over both seat 14 and fuel tank 16. An important advantage of the invention is that protective covering 20 may be extended and locked in the extended configuration with a single quick motion by the rider, wherein the rider merely grasps the protective cover and pulls it to the front of fuel tank 16. Later, when the rider returns to his motorcycle, he merely disconnects protective covering 20 from the front of tank 16 and allows the tension from spool assembly 34 to retract protective cover 20 into housing 12.

Figure 6:
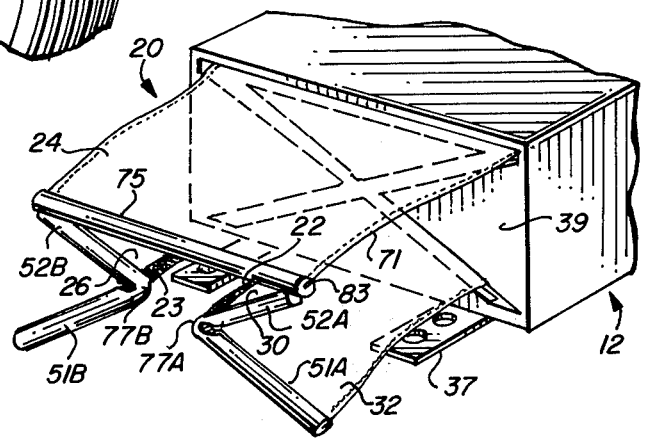
FIG. 6 is a perspective view illustrating the partially retracted protective cover and connectors utilized to fasten the extended end of the protective cover to mating connectors attached to the front of the fuel tank to hold the protective cover in an extended position.

Referring now to FIGS. 2 and 6, protective covering 20 includes top panel 24, two upper side panels, and two lower side panels. FIGS. 2 and 6 show upper side panel 30 and lower side panel 32, which together form one complete side panel. These panels are made from a durable waterproof material, such as heavy nylon or composite fabric. This material does not fold well, making it difficult for such material to be rolled up on a spring loaded spool if the material must be folded prior to being rolled up.

According to the present invention, upper side panel 30 is fastened to top panel 24 by stitching 71 or by use of suitable gluing or laminating techniques, causing upper side panel 30 to readily fold upward against the underside of top panel 24 as protective cover 20 is retracted and rolled onto spool assembly 34. The opposite upper side panel, designated by numeral 26, is attached to top panel 24 in a similar manner.

Lower side panel 32 is attached to upper side panel 30 by means of a hinge strip 22 formed from a strong but highly flexible material. Hinge strip 22 permits lower side panel 32 to be smoothly and easily folded upward against upper side panel 30 as protective cover 20 is retracted. The opposite lower side panel is similarly attached to upper side panel 26 by a similar flexible hinge strip 23.

Figure 5:
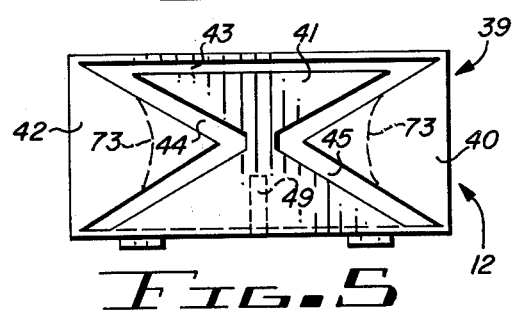
FIG. 5 is a front view of the housing of the retractable protective cover wherein V-shaped guides aid the folding of the protective cover as it is retracted.

Referring to FIGS. 5 and 6, it is seen that housing 12 has a front plate section 39 formed of a left V-shaped plate 42 and a right V-shaped plate 40 rigidly supported by housing 12. Front plate section 39 also includes a rigid member 41 spaced from the top of housing 12 and also evenly spaced from V-shaped plates 42 and 40 to provide a continuous slot comprised of top slot 43 and V-shaped slots 44 and 45. Top panel 24 is fed out of top slot 43, and the upper and lower side panels are fed out of slot portions 44 and 45 as protective cover 20 is unrolled from spool 20A and withdrawn from housing 12. The V-shaped slots 44 and 45 act as guides to unfold the upper and lower side panels as protective cover 20 is withdrawn from housing 12. V-shaped slots 44 and 45 also guide the upper and lower side panels into housing 12 so that the side panels are properly folded against each other and against top panel 24 as protective cover 20 is re-wound back onto spring loaded spool 20A. The polypropylene end bars described below are sufficiently large that they are prevented from being pulled into housing 20 through slots 43, 44, and 45.

Referring to FIG. 6, a cylindrical polypropylene bar 75 has a slot 83 extending the length of bar 75. The length of bar 75 is approximately equal to the width of top panel 24. The leading edge of top panel 24 is inserted into and firmly secured within slot 83, by means of glue, for example. Thus, polypropylene bar 75 serves as a rigid end support for top panel 24. A composite bar includes two hinged sections 51A and 52A, each having a slot therein for receiving the leading edges of upper side panels 30 and 32, respectively, and serves as a composite end bar support for side panels 30 and 32. The edge of upper side panel 30 is securely engaged by the slot in end bar section 52A; similarly, the leading edge of lower side panel 32 is securely engaged by the slot of end bar section 51A. End bar sections 51A and 52A and hinge section 77A are integrally formed, preferably of polypropylene. Hinge 77A is preferably approximately 40 mils thick, thereby forming a highly flexible, yet reliable and strong hinge between end bar sections 51A and 52A. End bar sections 51A and 52A are sufficiently thick to provide the desired amount of rigidity, and also are sufficiently thick to avoid being pulled through slots 43, 44, and 45 of FIG. 5.

Composite end bar 51B, 77B, 52B is similarly formed to provide an end support for the opposite upper and lower side panels.

The foregoing end bars provide means for the motorcycle rider to quickly grip the protective seat cover 20 and draw it forward from housing 12 to the front of motorcycle tank 16. End bars 52A and 51A, and also 52B and 51B, are readily unfolded at their respective hinges as the side panels unfold. The composite end bars are then inserted into slotted receiving tubes 81A and 81B, which are fastened to the forward frame of motorcycle 10, as indicated in FIGS. 2 and 3. Each of the receiving tubes has a bottom, such as bottom 82 of receiving tube 81A, as shown in FIG. 2.

Figure 7:
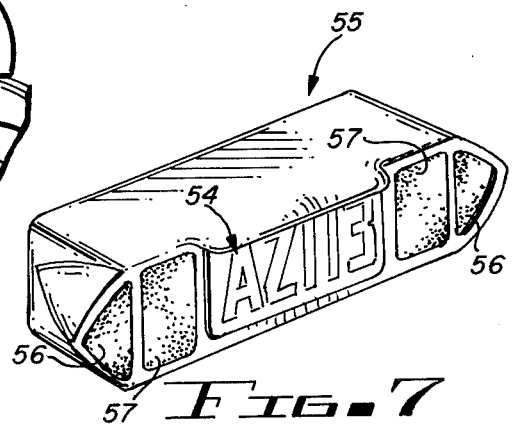
FIG. 7 is a perspective view of an alternate housing further incorporating brake lights, turn signal lights, and a license plate holder.

The foregoing elements permit convenient folding of protective cover 20 as it is retracted on spool assembly 34. The foregoing elements further cooperate to permit the four side panels to hang downward along the sides of the seat and tank of the motorcycle, as shown in FIG. 2, as protective cover 20 is drawn from housing 12, even though heavy, weatherproof materials are utilized to form the various panels of protective cover 20. No awkward handling operations are required to accomplish either folding or unfolding of the various panels of protective cover 20 as it is extended or retracted. According to the present invention, folding and unfolding of the side panels during extension and retraction of protective cover 20 is aided by means of V-shaped guides 40 and 42 of front member 39 of housing 12. Alternatively, guide members 40 and 42 need not be exactly V-shaped; curvature as indicated by dotted lines 73 may, in some cases, provide more trouble free guiding of the side panels during extension and retraction of protective cover 20. Housing 12 may be incorporated into a variety of motorcycle accessories. For example, housing 12 may be incorporated into a unit such as 57 of FIG. 7, which includes tail lights 56 and 57 and supports license plate 54. Housing 12 may be attached to the rear of a luggage rack (not shown) so that items such as a briefcase strapped to the luggage rack can be covered when protective cover is extended.

I claim:

1. A retractable protective covering apparatus for attachment to a motorcycle for covering the seat and fuel tank of the motorcycle, said apparatus comprising in combination:
   (a) a housing;
   (b) a spring loaded spool mounted in said housing;
   (c) a protective cover formed of flexible waterproof material, said protective cover being extendable to cover the tank and the seat of the motorcycle, said protective cover being wound around said spring loaded spool, said protective cover including
      i. a top panel, having a width approximately equal to the length of said spring loaded spool;

ii. first and second flexible upper side panels each having an inside edge attached to a respective inside edge of said top panel;

iii. first and second flexible lower side panels hingeably connected to said first and second upper side panels, respectively;

iv. first and second flexible hinge strips connecting said first and second upper side panels, respectively, to said first and second lower side panels; and (d) fastening means attached to an extendable end edge of said protective cover for maintaining said protective cover in an extended configuration over the tank and seat of the motorcycle;

(e) sloted guide means on said housing for facilitating automatic folding of said panels;

whereby said first and second upper panels and said first and second lower panels fold easily toward said top panel to permit said protective cover to be conveniently rolled upon said spring loaded spool.

2. The retractable protective covering apparatus of claim 1 wherein said fastening means includes a plurality of slotted bars attached by means of said slots to said side panels, slotted and receiving tubes attached to the front frame of said motorcycle for receiving said slotted bars and side panels, thereby maintaining said protective cover in an extended configuration over said seat and fuel tank.

3. The retractable protective covering apparatus of claim 2 wherein said slotted guide means having continuous slots for guiding said protective cover as it is drawn into or drawn from said housing, said continuous slot including a flat top slot for guiding said top panel and first and second symmetrically opposed approximately V-shaped slots for guiding said upper and lower side panels.

4. The protective covering apparatus of claim 3 wherein said top panel, said first and second upper side panels, and said first and second lower side panels are made of nylon material.

5. The protective covering apparatus of claim 4 wherein said first and second hinge strips are made of nylon material.

6. The retractable protective covering apparatus of claim 1 wherein said first and second upper side panels are attached to said top panel by stitching.

7. The retractable protective covering apparatus of claim 1 wherein said first and second hinge strips are attached to said upper and lower side panels by stitching.

8. The retractable protective covering apparatus of claim 1 wherein said housing is integrally formed with an accessory attached to the motorcycle, the accessory being capable of utilization for other purposes than containing said retractable protective covering apparatus.

9. The retractable protective covering apparatus of claim 7 wherein said accessory serves as a mounting for rear lights of said motorcycle.

10. The retractable protective covering apparatus of claim 2 wherein said slotted bars are composed of polypropylene, and wherein a pair of said slotted bars are connected by a thin polypropylene hinge integrally formed with said pair of slotted bars, one of said pair being attached to one of said side panels and the other one of said pair being attached to the corresponding one of said lower side panels, said polypropylene hinge bending with said hinge strip connecting said upper and lower side panels as said upper and lower side panels fold.

* * * * *